United States Patent [19]

Rica et al.

[11] 4,384,463
[45] May 24, 1983

[54] FLEXIBLE BAG COOLING ARRANGEMENT

[75] Inventors: Albert F. Rica, Stockton; Lloyd F. Hay, Oakdale; John R. Heron, Danville; John R. Webber; Steven A. Rechtsteiner, both of Stockton, all of Calif.

[73] Assignee: FranRica Mfg. Inc., Stockton, Calif.

[21] Appl. No.: 286,065

[22] Filed: Jul. 23, 1981

[51] Int. Cl.³ .............................................. F25D 17/02
[52] U.S. Cl. .................................... 62/374; 62/380;
    198/952; 426/405; 426/410; 426/412; 426/524
[58] Field of Search ............. 426/393, 405, 410, 412,
    426/524; 62/63, 374, 64; 198/952; 53/440

[56] References Cited

U.S. PATENT DOCUMENTS

| 2,597,223 | 5/1952 | Burgess | 62/63 |
| 3,052,559 | 9/1962 | Peebles | 426/410 |
| 3,205,543 | 9/1965 | Morris et al. | 62/63 |
| 3,464,835 | 9/1969 | Castro | 426/412 |
| 3,481,688 | 12/1969 | Craig et al. | 21/56 |
| 3,987,602 | 10/1976 | Stahl | 53/440 |

*Primary Examiner*—Ronald C. Capossela
*Attorney, Agent, or Firm*—Wood, Herron & Evans

[57] ABSTRACT

A dual cooling tunnel arrangement for cooling viscous heated fluid foodstuffs in flexible bags. The flexible bags containing the heated fluids are received on pivoted wire carriers which are driven by an endless chain through an upper cooling tunnel in a first direction and returned through a second cooling tunnel in the opposite direction. In each cooling tunnel, a cooling water spray is directed on the bags in the carriers as the carriers are slowly rocked, causing the fluid in each bag to flow to different areas of the bag, altering its shape, to produce enhanced heat transfer rates and a more uniform temperature distribution throughout the fluid during cooling.

13 Claims, 20 Drawing Figures

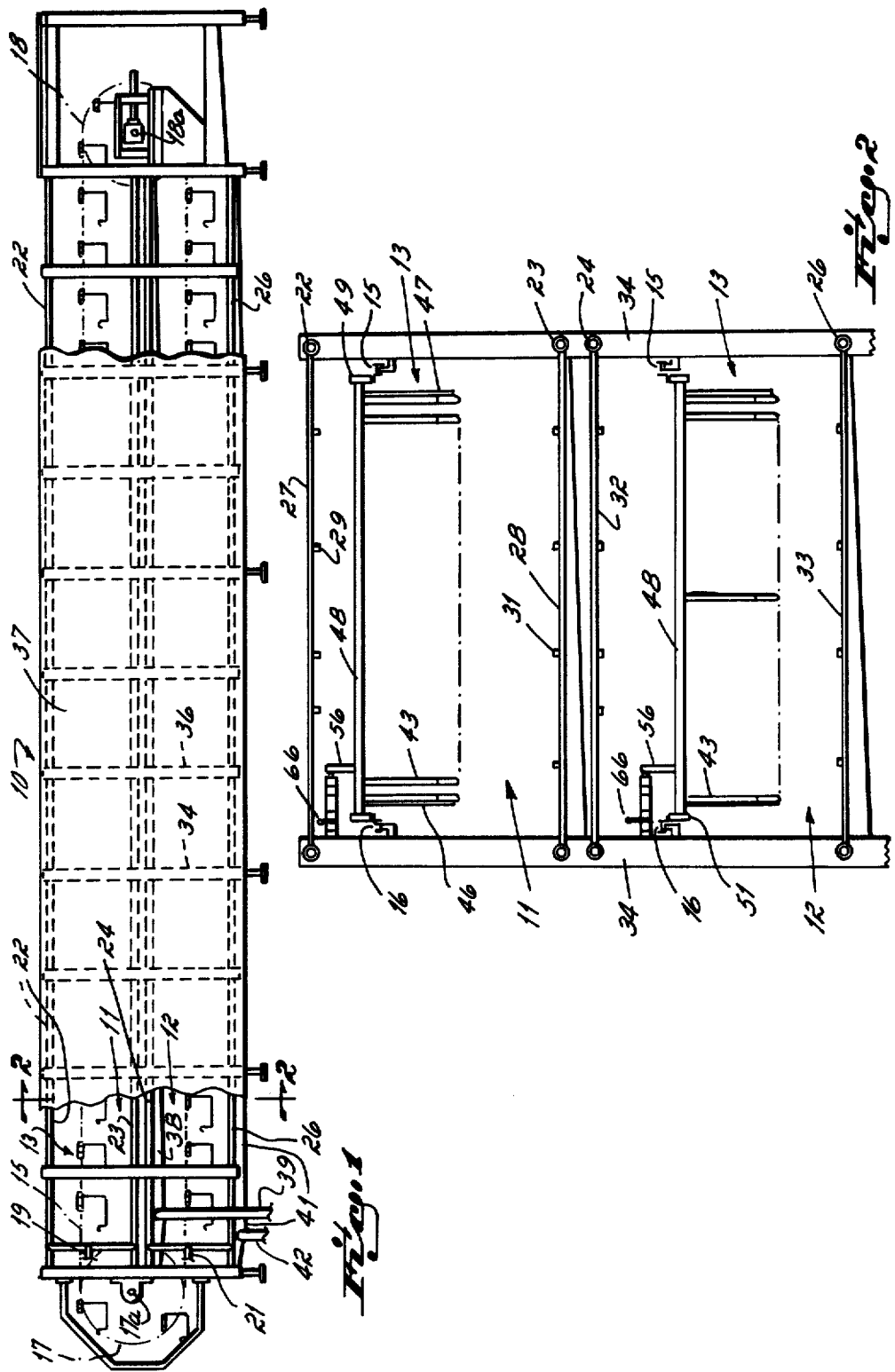

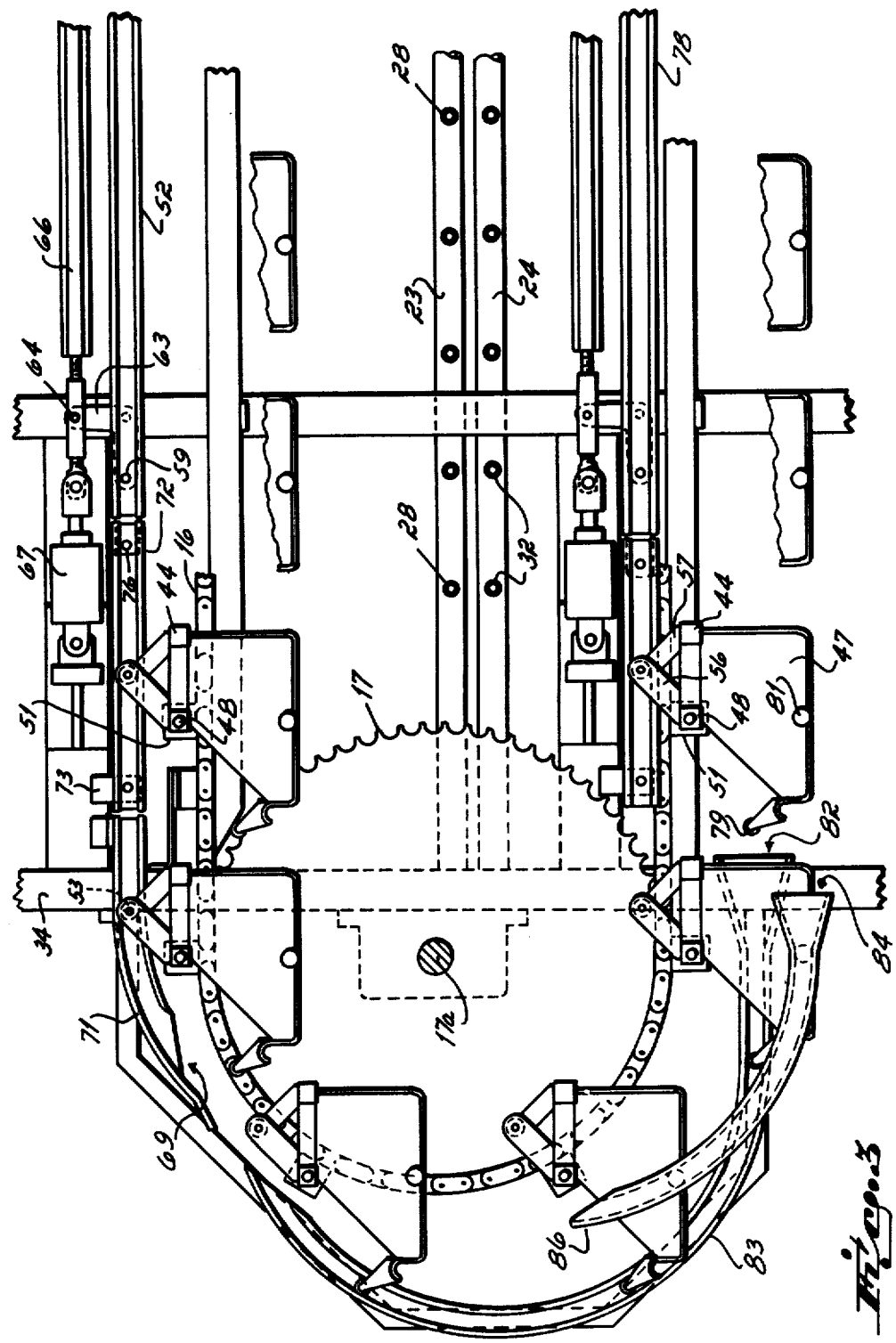

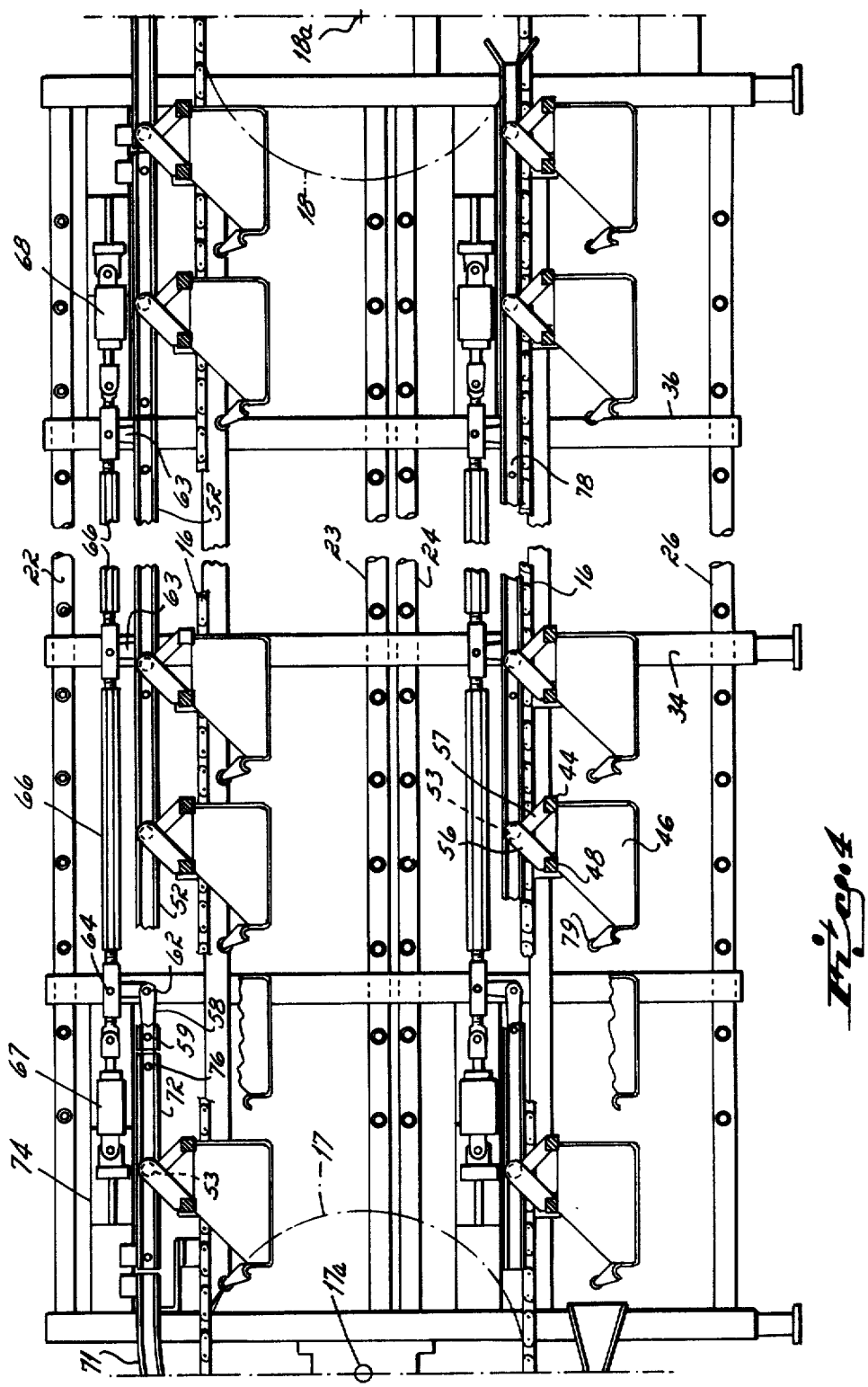

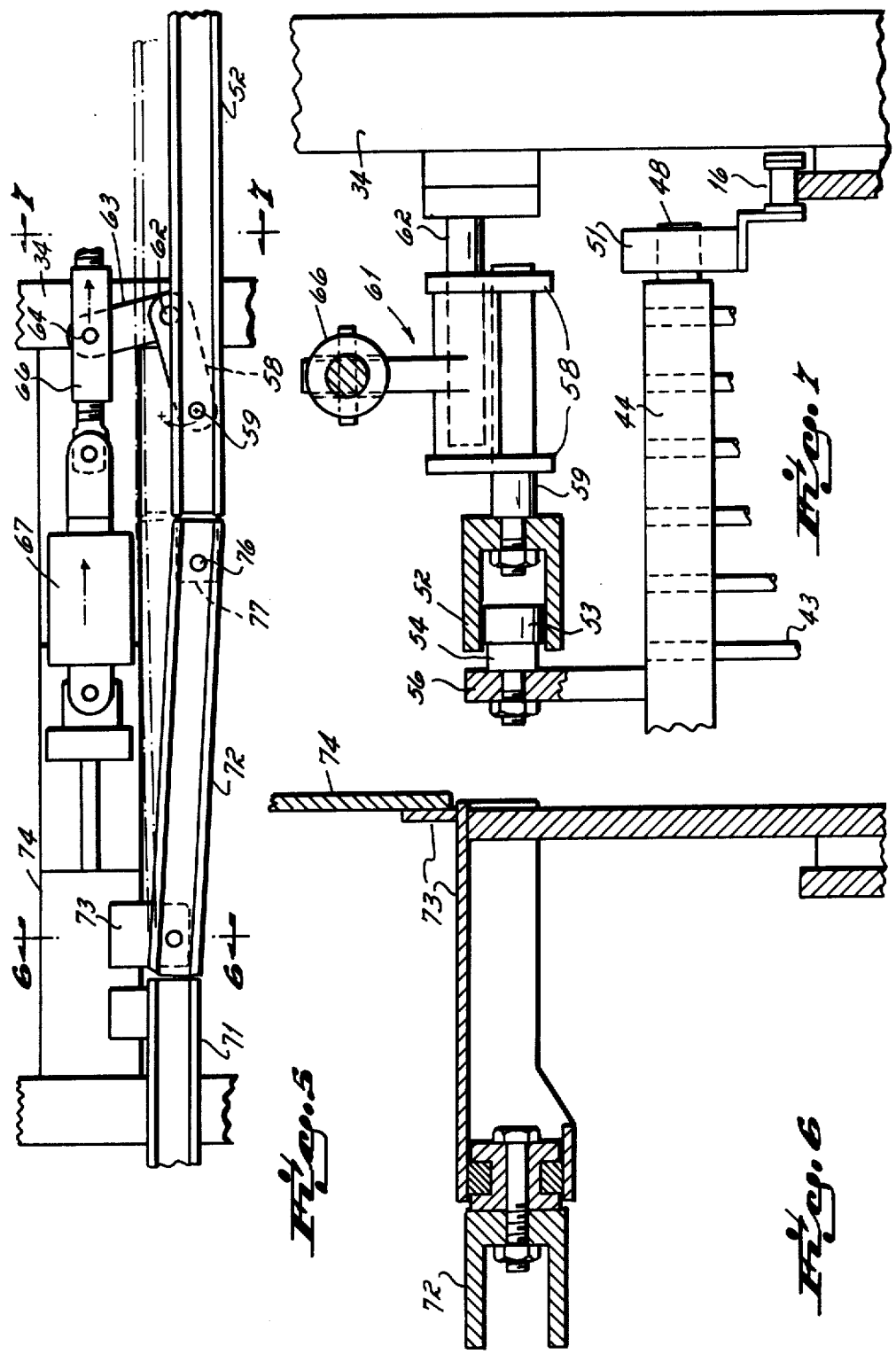

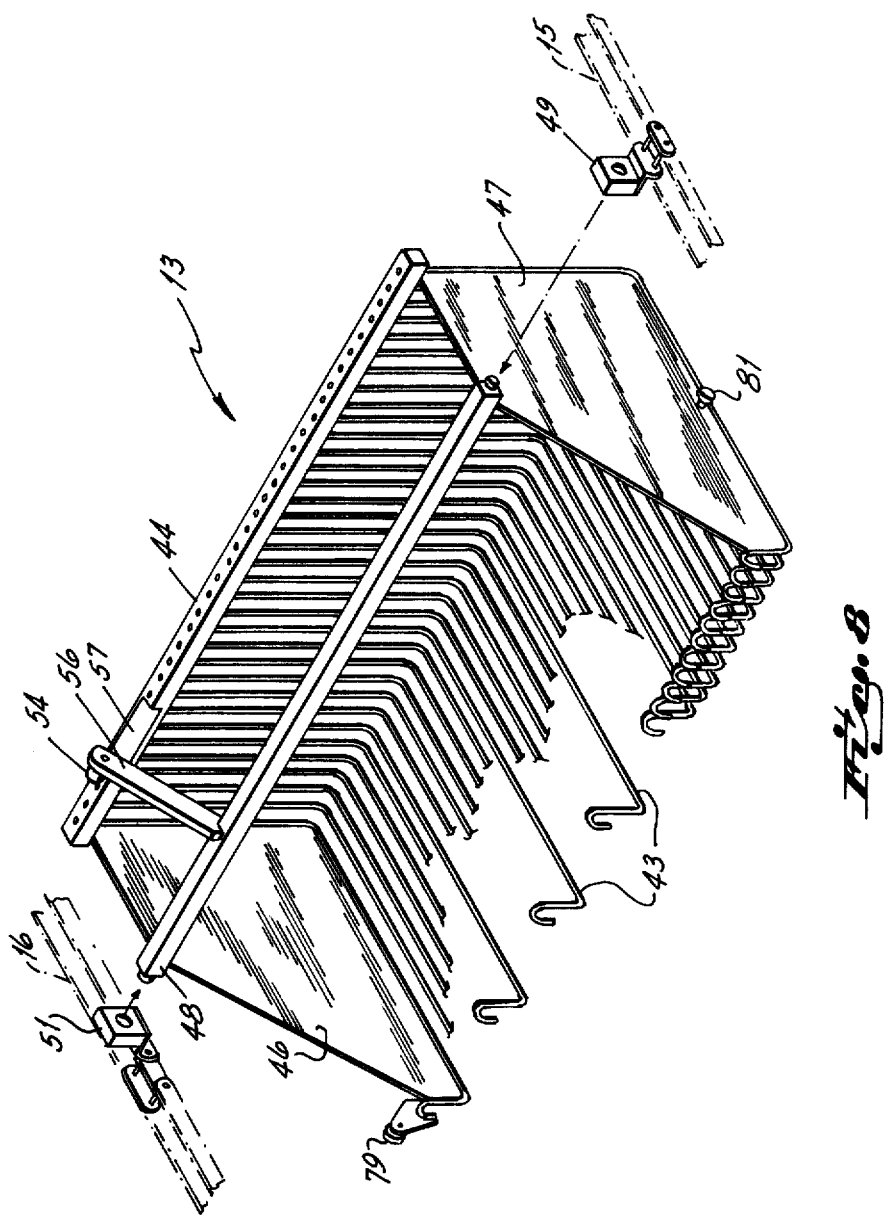

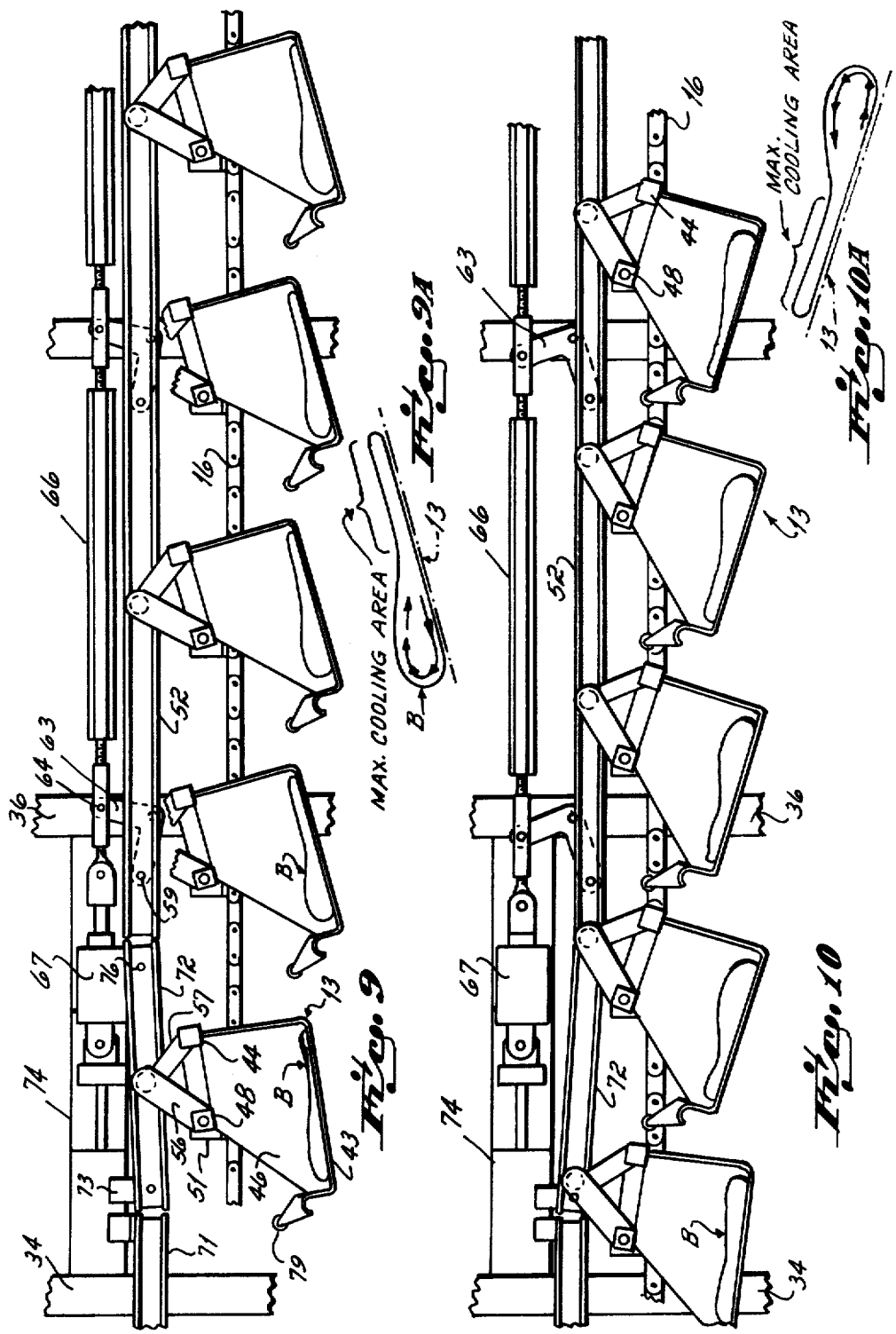

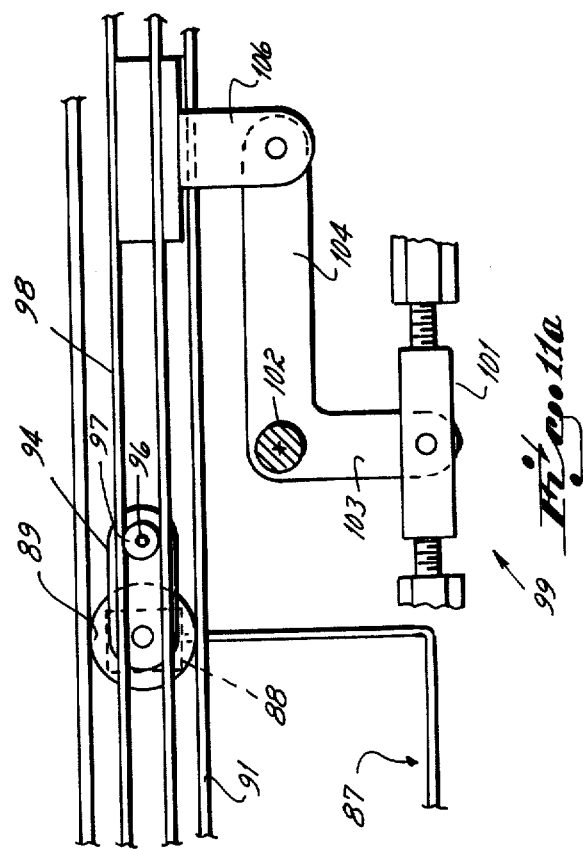
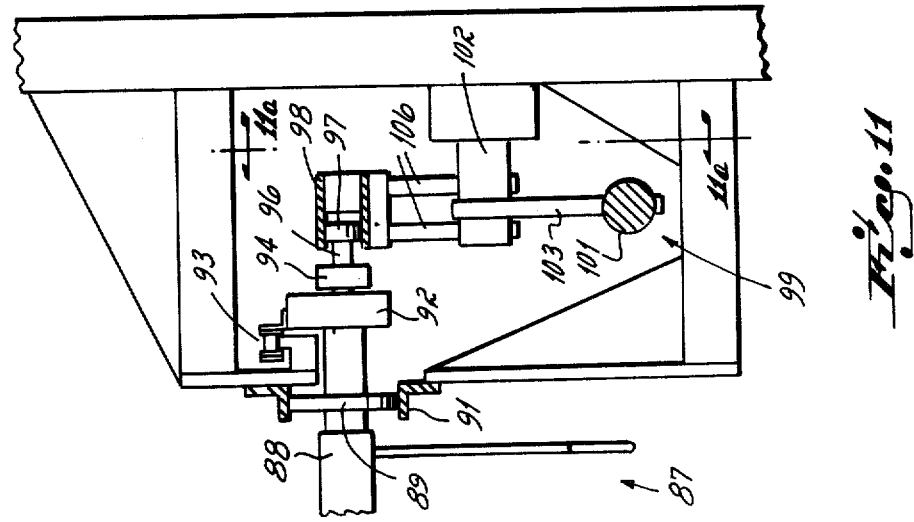

FLEXIBLE BAG COOLING ARRANGEMENT

DESCRIPTION OF THE INVENTION

This invention relates generally to heating and cooling of fluids and more particularly, concerns a cooling arrangement for a heated fluid food material in a flexible bag.

There are various advantages, such as reduced weight, reduced shipping costs and reduced storage requirements for empty containers prior to filling, in packaging certain food products in flexible bags rather than cans. Typical products for such packaging include, for example, crushed pineapple, tomatoe paste, and diced tomatoes in the form of a viscous water-containing fluid.

In handling food products, a primary concern is sterilization, both of the food and of the container in which it is packaged. Past practice in filling a flexible bag with a food product has been to first sterilize the bag and the food through heating. Subsequently, the food is cooled and the sterile bag is filled with cooled, sterile food under aseptic conditions. An alternate approach to bag filling is to separately sterilize the food and fill the bag while the food is still heated, subsequently completing the sterilization of the bag by the product. The bag is then sealed and cooled. The advantage of this alternative approach is that the bag need not be filled in an aseptic environment using sophisticated bag filling equipment.

Cooling the food in the flexible bag is somewhat more difficult than cooling the food before it is placed in the bag. This is primarily due to the greater difficulty in cooling the innermost portion of the food in the bag, particularly when the food is viscous. Since the bag is sealed, the food material inside cannot be stirred, mixed or dispersed in the presence of a cooling medium to effect rapid and uniform cooling. In practice, a coolant such as chilled water is sprayed onto the bag more or less continuously for a period of time, but the efficiency of heat removal decreases as the outermost portions of the food in the bag become relatively cool, while the interior portion remains relatively hot. It would be desirable to improve the efficiency of this food packaging process by reducing the time necessary for cooling the bag and its contents after filling.

It has been proposed to vibrate a filled flexible bag containing a viscous food material in order to produce some mixing of the contents of the bag. One manner of doing this is to place filled flexible bags on a screen or the like and to vibrate the screen, thereby transferring the vibrations to the fluid filled bags. By using a screen, the bags are more or less accessible for spraying chilled water from both above and below during the cooling process. While such a vibrating arrangement does provide a certain amount of agitation of the contents of the bag, it does not significantly affect the problem of a "hot spot" at the center of the bag contents.

It is consequently an object of the present invention to provide a cooling arrangement for a heated fluid food material in a flexible bag, particularly a food material of substantial viscosity, so as to produce a more uniform temperature distribution throughout the fluid as it is cooled to thereby reduce the amount of time necessary to cool the fluid food material to a desired temperature.

It is a more general object of the present invention to provide a heat exchange arrangement for a viscous fluid in a flexible bag to enhance the efficiency of a heat exchange medium in contact with the bag.

It is a subsidiary object of the invention to provide a cooling arrangement for a heated fluid food material in a flexible bag which includes a simplified cooling tunnel structure to minimize cost. This is accomplished by defining a cooling area comprising a framework of pipes for a cooling medium which serve the additional function of a framework for the cooling area.

It is a further subsidiary object of the invention to provide such a cooling arrangement in which, in at least one portion thereof, there is reduced need to chill the cooling medium. To accomplish this, the cooling effect is enhanced by drawing air through that portion of the cooling area to enhance evaporative cooling of water on the bags and to lower the water temperature.

Other objects and advantages of the invention will become apparent upon reading the following detailed description and upon reference to the drawings, in which:

FIG. 1 is a side view of a cooling arrangement in accordance with the present invention, with portions removed;

FIG. 2 is a cross-sectional view of the arrangement of FIG. 1 taken along the line 2—2 of FIG. 1 and showing bag carriers therein;

FIG. 3 is an enlarged side view of the front portion of the cooling arrangement of FIG. 1;

FIG. 4 is a side view of the central portion of the cooling arrangement of FIG. 1 with a section removed;

FIG. 5 is an enlarged side view of an end of the linkage support mechanism of FIG. 3;

FIG. 6 is a sectional view taken along the line 6—6 of FIG. 5;

FIG. 7 is a sectional view taken along the line 7—7 of FIG. 5 and showing a portion of a carrier in relation to the linkage support mechanism;

FIG. 8 is a perspective view of a carrier;

FIGS. 9, 9a, 10 and 10a show a series of bags in carriers rocked by the linkage mechanism forwardly and rearwardly, respectively;

FIGS. 11 and 11a show an alternative carrier drive and rocking arrangement;

Figure 12:
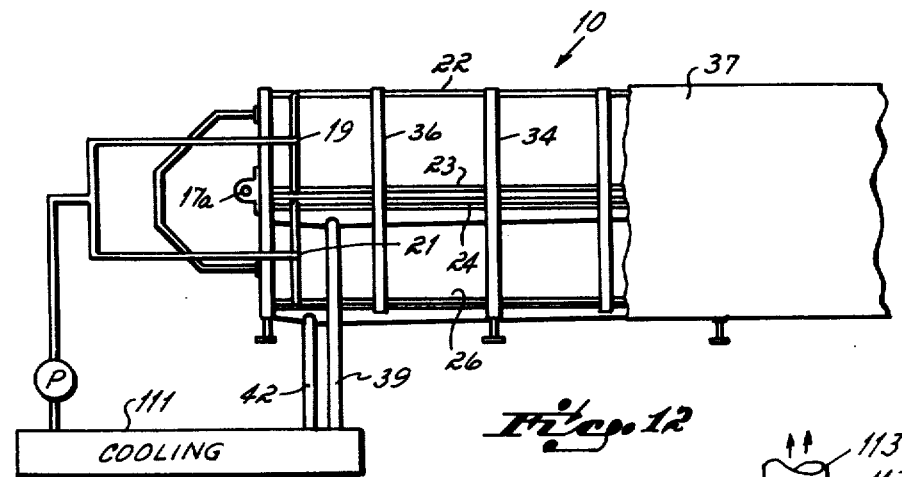
FIGS. 12 and 13 show alternative cooling medium arrangements.

In meeting the primary objective of the invention, there is described a cooling arrangement for a heated fluid, or flowable, food material in a flexible bag which includes a carrier for the bag and a cooling area containing a cooling medium and the carrier and bag, with means for imparting a rocking motion to the bag by way of the carrier so that the fluid food material flows to different areas in the bag, altering the shape of the bag, thereby producing enhanced cooling rates and a more uniform temperature distribution throughout the fluid as it is cooled.

In meeting the subsidiary objects of the invention, the presently disclosed cooling arrangement includes a pair of cooling tunnels which comprise the cooling area, in which the cooling tunnels comprise sheet metal panels which are structurally supported, at least in part, by pipes carrying water (to serve as a cooling medium) to and from the cooling tunnels. In addition, one of the cooling tunnels may be supplied with unchilled water and receive an enhanced cooling effect by drawing air through the tunnel to provide evaporative cooling of the cooling medium on the bag as well as a reduction in temperature of the cooling medium.

While the invention is susceptible to various modifications in alternative forms, certain illustrative embodiments have been shown by way of example in the drawings and will herein be described in detail. It should be understood, however, that it is not intended to limit the invention to the particular form disclosed, but on the contrary, the intention is to cover all modifications, equivalents and alternatives falling within the spirit and scope of the invention as defined by the appended claims. For example, the invention is discussed with reference to cooling heated food material; the material to be cooled may, of course, be other than food.

With reference to the figures, a cooling arrangement 10 embodying the present invention has an upper horizontal cooling tunnel 11 and a lower horizontal cooling tunnel 12, both of generally rectangular cross-section, through which filled flexible bags on carriers, such as 13, are moved in a horizontal direction during a cooling operation. As viewed in FIG. 1, the carriers are loaded and unloaded with bags B (see FIG. 10) at the left end of the cooling arrangement 10 and are moved, when loaded, from left to right through the upper cooling tunnel 11 and returned from right to left through the lower cooling tunnel 12. In order to move the carriers as described, they are attached to a pair of endless chains 15, 16 which are driven (clockwise as viewed in FIG. 1) about two pairs of sprockets 17 and 18 mounted for rotation on horizontal shafts 17a and 18a.

The cooling area of the cooling arrangement 10 consists of the upper and lower cooling tunnels 11, 12. In order to cool the bags of heated fluid food material carried on the carriers, water is sprayed on the bags as they move through the cooling tunnels. Advantageously, the water is distributed through a network of pipes which also serves as a significant portion of the framing structure for the cooling tunnels. Water for the upper cooling tunnel 11 is supplied under pressure through an inlet 19, and water for the lower cooling tunnel 12 is supplied under pressure through an inlet 21. The water for the upper cooling tunnel 11 is coupled through the inlet 19 to an upper manifold pipe 22 and a lower manifold pipe 23, each of which extend longitudinally along the upper cooling tunnel 11. In order to spray water onto the bags in the carriers, a series of transverse upper spray pipes 27 and lower spray pipes 28 communicate with the upper and lower manifolds 22, 23, respectively. Each transverse spray pipe 27 has a series of spray nozzles 29 directed generally downwardly for spraying water onto the bags, and each transverse spray pipe 28 has a series of nozzles 31 generally upwardly directed for the same purpose. The lower cooling tunnel 12 has similar transverse spray pipes 32 and 33 with nozzles for directing a water spray onto the bags in the carriers.

Additional support for the cooling arrangement 10 is provided by a series of uprights 34, 36 which receive the longitudinal manifold pipes 22–26. The upper and lower cooling tunnels 11, 12 are enclosed by stainless steel panels indicated generally as 37 which are supported by the framework of water pipes. Below the upper cooling tunnel 11 is a run 38 for receiving the sprayed water which is directed to a drain line 39 for recirculation. Similarly, a lower cooling tunnel run 41 directs the sprayed water from the lower cooling tunnel 12 to a drainpipe 42.

With reference now in particular to FIG. 8, a typical carrier 13 for one or more flexible bags is formed of a series of generally L-shaped hangers 43 attached to a transverse bar 44. Stainless steel end panels 46, 47 are attached to the two endmost hangers and to the transverse bar 44. In order to couple the carrier 13 to the chains 15, 16, a second transverse bar 48, attached at each end to one of the end plates 46, 47, is pivotally received in blocks 49, 51 which are rigidly attached to oppositely disposed links of the chains 15, 16, respectively. Driving one pair of sprockets, such as 18, therefore rotates the endless chains 15, 16 and moves the carriers through the cooling tunnels 11 and 12.

In accordance with the invention, as the carriers are moved through the cooling tunnels, they are rocked about an axis running longitudinally through the transverse bar 48. In order to do this, a force is applied through a horizontally disposed, vertically moving track 52 disposed parallel to the upper reach of the chain 16 (FIGS. 5 and 7), to rock the carrier about the bar 48. The vertical motion of the track 52 is imparted to the carrier 13 through a roller 53 in the track which is rotatably received on a horizontal axle 54 attached to a carrier support structure made up of arms 56 and 57. The arms 56 and 57 are each connected together at one end to define a substantially vertical plane. This connection point is horizontally spaced apart from the track 52 along the axis of the axle 54, with the other end of the arm 56 being rigidly attached to the bar 48 and the other end of the arm 57 being rigidly attached to the bar 44. Consequently, as the track 52 and axle 54 move vertically, since the bar 48 is retained within the blocks 49, 51, the carrier 13 rotates about the longitudinal axis of the bar 48. As illustrated in FIGS. 5 and 7, the track 52 is moved downwardly, and therefore the transverse bar 44 is moved downwardly relative to the transverse bar 48, rocking the carrier backwardly to a position as shown in FIG. 10. Raising the track 52 rocks the carrier forwardly into a position generally as shown for the carriers in FIG. 9.

The track 52 extends substantially for the length of the upper cooling tunnel 11 and is pivotally attached at points 59 to arms 58 of crank arrangements designated generally 61, which are pivotally attached for rotation about a horizontal axis at 62 to the uprights 34, 36. Another arm 63 of each crank arrangement 61 is pivotally attached at 64 to a linkage 66 extending generally parallel to and coextensive with the track 52. In the illustrated form of the cooling arrangement, the linkage 66 is horizontally reciprocated by a pair of hydraulic cylinders 67, 68, which serve to raise and lower the track 52 above and below the position in which the carriers are untilted (which is illustrated in FIG. 4).

As best shown in FIG. 3, in the bag loading and unloading area of the cooling arrangement 10 the roller 53 on each carrier is not yet in the vertically movable track 52 and is first received in a flared opening 69 of a fixed arcuate track section 71. In order to interface between the fixed track section 71 and the vertically moving track 52, an intermediate straight track section 72 is provided. At one end, the intermediate track 72 is pivotally attached to a bracket 73 mounted on a linkage support 74. The linkage support 74 extends between the first pair of uprights 34, 36 and also supports the hydraulic cylinder 67 which drives the linkage 66. The other end of the intermediate track 72 is pivotally attached at 76 to an extending portion 77 of the track 52. Therefore, as the track 52 swings, substantially vertically, as driven by the linkage 66 through the crank mechanisms 61, a continuous path for the rollers 53 on the carriers is provided by the intermediate track 72 from the flared arcuate fixed track section 71 to the moving track 52.

A lower vertically movable track 78, corresponding to the track 52, provides the rocking motion for the carriers as they move through the lower horizontal cooling tunnel 12. The lower track 78 is terminated by intermediate tracks in the same manner as in the upper track 52, and it is also similarly hydraulically driven, although preferably the upper and lower hydraulic drives operate to rock the carriers in opposite directions.

The exact manner of providing the drive for the linkages 66 to effect rocking of the carriers is not critical and may be accomplished by appropriate hydraulic control, a cam arrangement, or numerical control techniques. Similarly, the selection of the drive for the chain sprockets is a matter of choice, with the drive preferably being supplied at the front sprocket axle 17a.

For the purpose of stabilizing the carriers as they are brought through the load/unload area of the cooling arrangement, asymmetric stabilizing rollers 79, 81 are provided at opposite sides of each carrier. The stabilizing roller 79 is received in a flared opening 82 of a fixed arcuate track 83, and the stabilizing roller 81 is received in a flared opening 84 of a fixed arcuate track 86. The asymmetrical positioning of the stabilizing rollers provides the requisite stability for unloading the cooled bags from the carriers when they reach the unloading area.

In FIGS. 11 and 11a, there is illustrated an alternative, preferred carrier drive and rocking arrangement. The bag-carrying portion of the carrier 87 is substantially the same as for the carrier 13. The carrier 87 has a transverse bar 88, extending across a cooling tunnel laterally, to which the remaining carrier elements are rigidly attached. The transverse bar 88 rotatably receives and is supported by a pair of rollers 89 which travel through the cooling tunnel on tracks 91. The shaft 88 is also rotatably received in a pair of blocks 92 which are rigidly attached to endless chain drives 93, substantially identical to the chain drives 15, 16. Only one side of a carrier 87 and its associated support track 91 and drive chain coupling has been illustrated, but it should be understood that there are corresponding elements on the other side of the carrier so that it is supported for horizontal movement through a cooling tunnel. A crank arm 94 on one side of the carrier is fixed to an extension of the bar 88 and has a horizontal offset pin 96 terminating in a rotatable roller 97. The roller 97 is carried in a track 98, which extends horizontally through the cooling tunnel and which is vertically movable by a linkage arrangement 99. Vertical movement of the track 98 rotates the crank arm 94 and the bar 88 to effect rocking of the carrier 87.

In order to permit freer spraying of the carriers, the linkage arrangement 99 in this instance is located generally below and laterally of the carriers and includes a horizontally reciprocable linkage 101. A series of right-angle crank elements are each pivotally attached for rotation about a horizontal axis at a point such as 102 to a different support post or other structural member of the cooling arrangement. Each crank element has a first arm 103 pivotally attached to the linkage 101 and a second arm 104 pivotally attached to a pair of vertical legs 106 fixed to the track 98.

In order to rock the carriers, the track 98 is raised and lowered, thereby turning each carrier crank arm 94 and rotating each carrier about its axis, the rod 88, counterclockwise and clockwise, respectively, as viewed in FIG. 11a. The track 98 is raised and lowered by longitudinally reciprocating the linkage 101 alternately in opposite horizontal directions, which rotates each crank arm 104 in the series of crank elements along the track about its pivot 102. This rotation raises and lowers the end of the arm 104 and thus the track 98.

Figure 13:
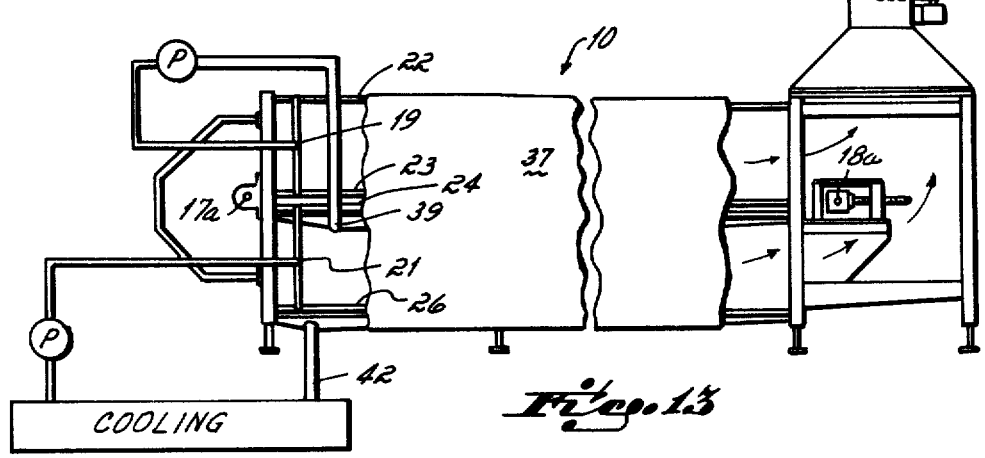

FIGS. 12 and 13 diagrammatically illustrate two possible forms for the distribution of a cooling medium to be sprayed into the cooling tunnels. In the illustrated forms, the cooling medium is a water spray in an air environment. In the FIG. 12 system, shown in connection with the inlets and drains of the cooling arrangement 10 of FIG. 1, the water recovered from the cooling tunnels through the drains 39 and 42 is pumped through a chiller or other cooling arrangement and returned to both the upper and lower water inlets 19 and 21. In this form of the cooling arrangement 10, chilled water is supplied to both cooling tunnels.

In FIG. 13, only the lower cooling tunnel water is cooled, and the water in the upper cooling tunnel is merely recirculated. In addition, a fan 112 draws air horizontally through the cooling tunnels and exhausts it through an exhaust 113. In this form of the cooling arrangement, less water cooling capacity is required. Drawing the air through the cooling tunnels provides evaporative cooling of water on the surface of the bags as well as cooling of the water in transit to the bags. The temperature differential between unchilled water and the bag contents is, of course, higher in the upper cooling tunnel, which is the first cooling tunnel traversed by the heated bags after they are loaded into the cooling arrangement 10. Therefore, if an arrangement such as is illustrated in FIG. 13 is utilized, the cooling tunnel receiving chilled water is preferably the lower cooling tunnel, or the second tunnel traversed by the bags to be cooled.

Figure 14:
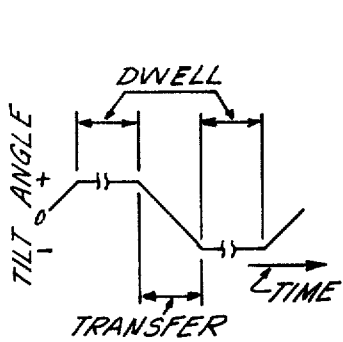
FIG. 14 is a motion diagram for the rocking of the carriers.

The preferred pattern for the rocking motion of the carriers is illustrated in FIG. 14. For purposes of definition, a positive tilt angle for a carrier may be regarded as forward tilting (as illustrated in FIG. 9). Rearward tilting may be regarded as a negative tilt angle. In order to set a positive and negative tilt angle for each carrier (which will be substantially the same for all carriers in a given cooling tunnel since most will have a roller 53 in track 52 or 78), the amount of horizontal travel leftward and rightward of the linkage 66 is established. As illustrated in FIG. 14, preferably the positive and negative tilt angles are equal. Also, once the full desired positive tilt angle is obtained, there is a dwell period followed by a transfer period when the carriers are rocked to the negative tilt angle position, in which position there is another dwell period before transferring the carriers back to the positive tilt angle position.

While it is preferred, it is not essential that the positive and negative tilt angles be the same; and while a linear transfer between positive and negative tilt angles has been illustrated, such linearity is not required. The transition between tilt angles should, however, be sufficiently smooth to permit the flow of the fluid material from a side of the bag at the positive tilt angle position (such as illustrated in FIG. 9) to the opposite side of the bag at a negative tilt angle position (as illustrated in FIG. 10). The flow pattern achieved in preferred operation is in the nature of a "figure 8", laid on its side, as the fluid material in each bag flows and mixes during the rocking. As shown in FIG. 9a, for a positive tilt angle, the flowable material in a bag B flows downwardly and leftwardly, increasing the volume of material in that portion of the bag and altering the shape of the bag. As the material continues to flow to the lowered portion of the bag, the bag contents already there move upwardly and rightwardly, generally establishing a flow path as indicated by the arrows in FIG. 9a. The analogous flow for fluid in a bag at a negative tilt angle is illustrated in FIG. 10a. In both cases, the upper portion of the bag B, containing a lesser volume of the flowable material, is the area of maximum cooling.

The efficiency of cooling due to rocking the filled flexible bags increases as the volume of material in a bag increases and also as the viscosity of the material in a bag increases. Bags containing 30 gallons of heated fluid food material have been cooled using the present cooling arrangement, and it is probable that bags containing up to 40 or even 50 gallons may be cooled using this technique. As the fluid volume in a bag increases, the tilt angles must be reduced to avoid bag rollover or undesirable movement of a bag in the carrier. Increasing the volume of material in bags in the carriers does not require a significant adjustment of the dwell time, merely the above-mentioned reduction of tilt angle.

As mentioned, the effectiveness of rocking increases also as the viscosity of the material in a bag being rocked increases. In general, it is desirable to increase both the rocking angles and the dwell times for a given volume of fluid in a bag as the viscosity of the fluid in the bag increases. There is a limit to the achievable tilt angles in that creasing of the bag due to too great a tilt angle must be avoided. The longer dwell time for the higher viscosity fluid is required to permit time for the completion of the flow of the fluid to the lowered end of the bag after tilting.

Figure 15:
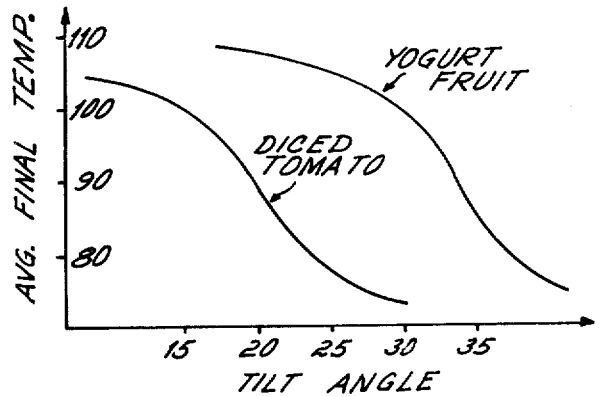
FIG. 15 is a graph of the final temperature variations of two food products over a range of tilt angles.

FIG. 15 illustrates graphically the average final temperatures for two different bagged fluid food materials over a range of tilt angles. The two products are diced tomatoes and the more viscous yogurt fruit. The bag size and content volume as well as cooling conditions were substantially the same for the two products. As can be seen for a given tilt angle, the more viscous yogurt fruit completes the cooling process at a higher temperature than the less viscous diced tomatoes. Similarly, to attain a given average final temperature for the more viscous yogurt fruit, a larger tilt angle is required. The two curves shown are typical of a family of curves representative of increasing viscosity, moving from the origin outwardly through the illustrated quadrant.

A figure of merit, a heat transfer coefficient h, may be derived from the following expression:

$$Mc(T_1 - T_2) = h \Delta T_m t. \tag{1}$$

In this formula, and the succeeding formulas, the terms have the meanings and units given in Table 1.

TABLE 1

| Term | Definition |
|---|---|
| M | weight of product being cooled (lbs.) |
| c | specific heat of product (BTU per lb. °F.) |
| $T_1$ | initial product temperature (°F.) |
| $T_2$ | final stirred product temperature (°F.) |
| h | heat transfer coefficient (BTU per °F. min.) |
| $\Delta T_m$ | log mean temperature difference between pro- |

TABLE 1-continued

| Term | Definition |
|---|---|
| $T_w$ | duct and cooling medium cooling water temperature (°F.) |
| t | time (min.) |

$\Delta T_m$, the log mean temperature difference between the heated product and the cooling medium, may be expressed as follows:

$$\Delta T_m = \frac{(T_1 - T_w) - (T_2 - T_w)}{\ln \frac{(T_1 - T_w)}{(T_2 - T_w)}}. \tag{2}$$

Rearranging equation 1, and substituting for $\Delta T_m$ from equation 2, yields:

$$h = \frac{\ln \frac{(T_1 - T_w)}{(T_2 - T_w)} Mc}{t}. \tag{3}$$

Equivalently, the cooling time t may be expressed as:

$$t = \frac{\ln \frac{(T_1 - T_w)}{(T_2 - T_w)} Mc}{h}. \tag{4}$$

The heat transfer coefficient h may be regarded as a rate of heat removal parameter, per log mean temperature differential. The coefficient h has significance in regard to the evaluation of the present cooling arrangement in that it is a quality factor of heat transfer efficiency which may be derived for a given setup of the cooling arrangement. In practice, for a given cooling arrangement, the heat transfer coefficient h is dependent upon the rate of air flow, the rate of water flow for the cooling spray, and the tilt angles, dwell times, and transfer times of the carriers. Variations in product weight and specific heat, water temperature and initial and final product temperatures, and cooling time are accounted for since they are factors of the equations.

With a 35° tilt angle, and with nine second dwell times and one second transfer times, and with 34° F. water for cooling, heat transfer coefficients on the order of 0.6 to 0.9 BTU per °F.-min. have been obtained. Utilizing an empirically determined value for h of 0.628 BTU per °F.-min., it can be calculated that a 50 lb. bag of a fluid material having a specific heat of 0.8 may be cooled from an initial temperature of 190° F. to a temperature of 95° F. in about 59.8 minutes. It has also been empirically determined that the heat transfer coefficient for the cooling arrangement in the case of no bag rocking may be estimated at approximately 0.3 to 0.5 BTU per °F.-min. The resultant calculated cooling time for such a heat transfer coefficient would range between 75 and 125 minutes for the same weight, specific heat, and temperatures as above.

The described cooling arrangement is suitable for use for a variety of viscous materials. Three general material categories are particularly amenable to the described cooling techniques: (1) fluid food products (e.g., tomatoe sauce, tomatoe paste, fruit juices, syrups), (2) particulate products in a slurry (e.g., yogurt fruits, jams, jellies), and (3) discrete product particles (e.g., diced tomato, carrot, beet, peach or pineapple and sliced pear, peach or apple).

A preferred bag for use in the described cooling arrangement is, when unfilled, rectangular, flat, and flexible, with a generally tubular fitment projecting from one wall through which the bag is filled and sealed with a suitable configured cap. In one instance rectangular bag walls, of which there are two, are heat-sealed along their perimeter. Each wall includes three separate sheets. The outer sheet of each wall is in the form of a laminate consisting of 0.0006 inch thick biaxially-oriented Nylon on the outside, 0.002 inch thick nonoriented blown polyethylene homopolymer on the inside, and a layer of aluminum type-E foil 0.00035 inch thick in the middle. The inner two remaining sheets of the three-sheet wall are identical, physically separate, 0.002 inch thick nonoriented polyethylene sheets. As indicated, the three-ply outer sheet, as well as the two non-laminated separate polyethylene sheets, are heat-sealed together about the rectangular periphery of the bag.

Available sizes of bags include 3.0, 4.5 and 30 gallons. The rectangular bag walls of the 4.5 gallon bag, for example, have interior dimensions of about 18.6 inches by 22.5 inches. The filler opening is about 63 mm. in diameter. When filled and placed in an untilted carrier, the bag has a "pillow height" of about 3.5 inches, with the tubular fitment height being about 4.5 inches above the bottom of the bag.

While the term viscosity has been used herein with regard to flowable materials to be cooled in the described cooling system, certain materials of a fibrous or pulpy nature, while not exhibiting high viscosity in a conventional sense, can be satisfactory cooled in bags using the invention. Accordingly, the term viscosity, as used herein, shall be understood to include reference to pulpy and/or fibrous materials.

What is claimed is:

1. A cooling apparatus for a heated flowable material comprising: a flexible bag containing the flowable material, a carrier for the bag, a cooling medium, means for defining a cooling area containing the cooling medium and the carrier and bag, and means for imparting a rocking motion to the bag by way of the carrier so that the flowable material flows to different areas in the bag, altering the shape of the bag, and thereby producing enhanced heat transfer and a more uniform temperature distribution throughout the material as it is cooled.

2. The cooling apparatus of claim 1 in which the carrier is pivotally mounted in the cooling area and the rocking means imparts a rocking motion to the bag by rocking the carrier about its pivot.

3. The cooling apparatus of claim 2 which further comprises a plurality of additional carriers pivotally mounted in the cooling area and rocked by the rocking means.

4. The cooling apparatus of claim 3 in which the cooling area comprises a cooling tunnel in which the carriers are linearly arrayed.

5. The cooling apparatus of claim 4 in which the cooling medium is an unchilled liquid and further comprising means for spraying the unchilled liquid onto the bags in the cooling tunnel and means for drawing air through the tunnel to enhance evaporative cooling of the fluid material in the bags through the evaporation of the cooling liquid on the bags.

6. The cooling apparatus of claim 4 which further comprises means for driving the carriers through the cooling tunnel.

7. The cooling apparatus of claim 6 in which the rocking means comprises a rocker track running along the cooling tunnel and mounted therein for movement generally perpendicular to the longitudinal dimension of the tunnel, each carrier having an associated lever arm with a first end received in the rocker track and a second end attached to the carrier spaced apart from the pivot point, and the rocking means further comprising means for moving the track, whereby a rocking motion is imparted to each of the carriers.

8. The cooling apparatus of claim 7 which further comprises a second cooling tunnel extending adjacent and parallel to the first cooling tunnel, and in which the drive means comprises an endless chain drive coupled to each of the carriers and operable to continuously move the carriers in a first direction through the first cooling tunnel and in a second, opposite, direction through the second cooling tunnel.

9. The cooling apparatus of any of claims 1, 4 or 8 in which the cooling medium is water and further comprising means for spraying the water on bags in the cooling area.

10. The cooling apparatus of claim 9 which further comprises means for recovering and recirculating the sprayed water from the cooling area, means for chilling the recovered water, and means for returning the chilled water to the spraying means.

11. The cooling apparatus of claim 5 which further comprises a second cooling tunnel and means for driving the carriers through the first cooling tunnel and then through the second cooling tunnel, the second cooling tunnel having associated means for spraying the liquid cooling medium onto the bags in the second cooling tunnel and also means for chilling the liquid cooling medium which is supplied to the spraying means of the second cooling tunnel.

12. The cooling apparatus of any of claims 1, 4 or 8 in which the means for defining a cooling area comprises a frame of pipe which is operable to carry the cooling medium to the cooling area and a plurality of walls mounted on the frame to substantially enclose the cooling area.

13. A heat transfer arrangement for a fluid comprising a flexible bag containing the fluid, a carrier for the bag, a heat exchange medium, means for defining a heat exchange area containing the heat exchange medium and the carrier and bag, and means for imparting a rocking motion to the bag by way of the carrier so that the fluid flows to different areas in the bag, altering the shape of the bag, and thereby producing a more uniform temperature distribution throughout the fluid as heat is transferred between the fluid and the cooling medium.

* * * * *